United States Patent [19]
Schrumpf et al.

[11] Patent Number: 5,090,237
[45] Date of Patent: Feb. 25, 1992

[54] PRESSURE SENSOR FOR DETERMINING TIRE PRESSURE

[75] Inventors: Hans Schrumpf, Oberasbach; Lothar Haas, Stein; Gerhard Hettich, Dietenhoten, all of Fed. Rep. of Germany

[73] Assignee: Robert Bosch GmbH, Stuttgart, Fed. Rep. of Germany

[21] Appl. No.: 601,742

[22] PCT Filed: Mar. 8, 1989

[86] PCT No.: PCT/DE89/00141
§ 371 Date: Oct. 26, 1990
§ 102(e) Date: Oct. 26, 1990

[87] PCT Pub. No.: WO89/10852
PCT Pub. Date: Nov. 16, 1989

[30] Foreign Application Priority Data

May 7, 1988 [DE] Fed. Rep. of Germany ....... 3815677

[51] Int. Cl.⁵ .............................. B60C 23/04
[52] U.S. Cl. .................... 73/146.5; 73/756; 116/34 R; 340/442
[58] Field of Search ............ 73/146, 146.5, 146.3, 73/146.2, 146.4, 756, 431; 340/442, 443, 444, 445, 446, 447, 448; 116/34 R

[56] References Cited

U.S. PATENT DOCUMENTS

| | | | |
|---|---|---|---|
| 2,868,908 | 1/1959 | Robinson | 340/442 |
| 3,881,170 | 4/1975 | Hosaka et al. | 73/146.5 |
| 4,768,375 | 9/1988 | Eckardt et al. | 73/146.5 |
| 4,790,179 | 12/1988 | Hettich | 73/146.5 |
| 4,843,872 | 7/1989 | Hebert et al. | 73/146.5 |
| 5,035,137 | 7/1991 | Burkard et al. | 73/146.5 |

Primary Examiner—Donald O. Woodiel
Attorney, Agent, or Firm—Michael J. Striker

[57] ABSTRACT

A pressure sensor for determining air pressure in an interior of a motor vehicle tire has a housing for extending into a recess formed in a rim wall of the tire, and an annular flange located on the housing and supporting a spring against a side of the rim wall which spring provides for clamping an outer flange portion of the pressure sensor housing against another side of the rim wall.

7 Claims, 2 Drawing Sheets

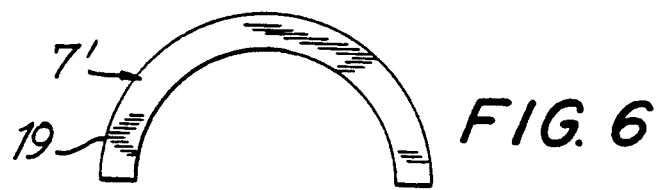
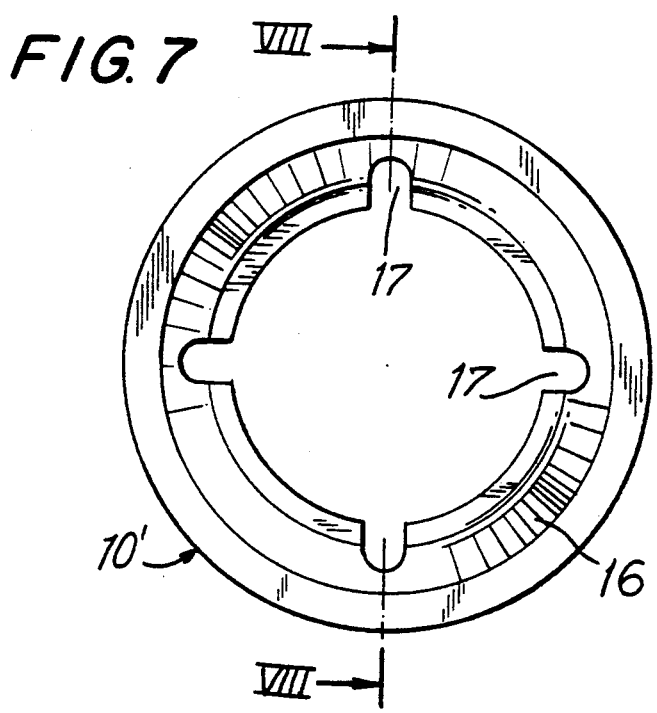
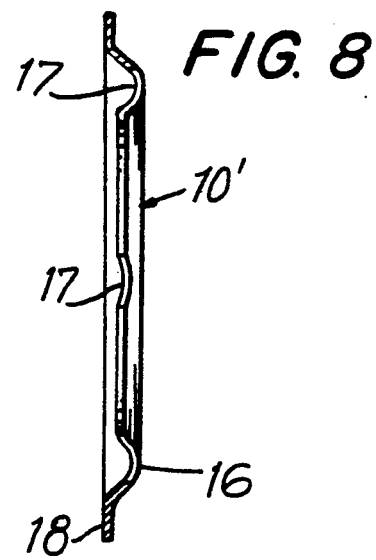
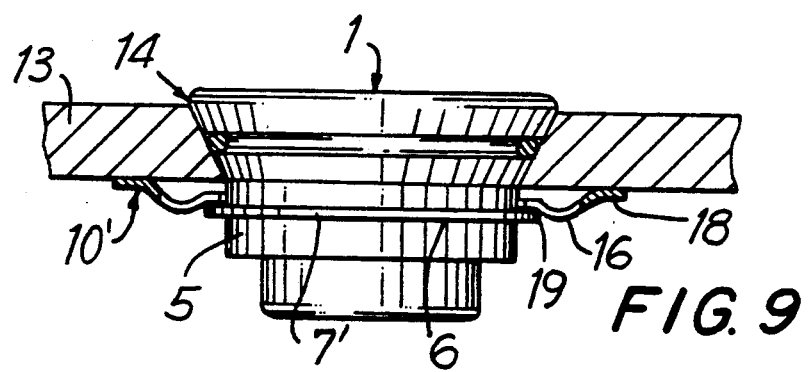

PRESSURE SENSOR FOR DETERMINING TIRE PRESSURE

BACKGROUND OF THE INVENTION

The invention relates to a pressure sensor or switch for determining the air pressure in the interior of tubeless tires of motor vehicles mounted on a rim, wherein the housing of the pressure sensor or switch penetrates a corresponding recess of a rim wall and is fastened at the rim in an airtight manner of fastening devices.

Such a pressure sensor, as is known e.g. from DE-OS 35 23 774, serves to monitor the air pressure in a tubeless motor vehicle tire and to send an electrical signal when the air pressure in the tire diverges from the normal state, particularly when the air pressure drops as a result of a defect in the tire wall.

In order to fasten such pressure sensors or switches the housing conventionally comprises an external thread and is inserted into a recess of the rim, wherein the housing is then clamped against the rim wall so as to be airtight by a nut secured on the thread.

This type of fastening has the disadvantage that the pressure sensor or switch projects relatively far over the rim wall due to the required thread length. This is undesirable in technical respects relating to mounting and involves the risk of damage when changing tires. But, above all, the detection interval for the signal transmission from the sensor to a receiver, which is fixed with respect to rotation relative to the latter, is reduced because of the metallic nut, which damps the resonant circuit provided for the signal transmission.

SUMMARY OF THE INVENTION

The object of the invention is a pressure sensor or switch that can be fastened at a rim wall in a simple manner so as to be protected against damage and so as to benefit the signal transmission and can be detached again as required.

This object is met, according to the invention, in that the housing comprises an outer flange portion which rests against the rim wall and a circumferentially extending annular flange at a distance from the latter, wherein spring elements are provided which are supported at the annular flange on one hand and at a side of the rim wall on the other hand in order to clamp the flange portion of the housing against the other rim wall.

This clamping by of a spring as discussed above, enables a quick and simple mounting which can be realized with a small overall height and offers the additional advantage that removal is not impeded by corrosion or damage to a thread.

It is preferably provided that the flange portion comprise a circumferentially extending annular groove for a sealing O-ring. An airtight closure of the tire interior is ensured in this way by the spring clamping.

The flange portion can be advantageously constructed in a conical manner for contacting a correspondingly constructed wall portion of the rim wall. A type of wedge clamping and accordingly a particularly secure fit can accordingly be achieved. If the wedge surface contacts the housing wall at the inside of the rim wall, the secure fit of the housing is further increased due to the centrifugal force.

In a particularly advantageous embodiment form, the annular flange is formed by two corresponding annular disk halves which can be inserted into an annular groove of the housing. It is accordingly readily possible to slide the housing of the pressure sensor or switch through the corresponding recess in the rim wall and then to attach the annular disk halves from the other side in order to achieve an axial fastening in this manner.

The spring which is provided between the rim wall and the annular flange can be constructed advantageously as a type of a plate spring, wherein details of shape can differ from the conical configuration of a plate spring.

It is advantageously provided that the plate spring comprises projections and recesses which correspond to corresponding recesses and projections of the annular disk halves. In this way, the annular disk halves are also fixed in the radial direction after attachment when the corresponding projections and recesses engage in one another.

In another embodiment form, it is provided that the plate spring comprise a circumferentially extending bead which engages over the annular flange. The two annular disk halves forming the annular flange can accordingly be secured radially.

Additional features, advantages and details of the invention follow from the following description of a preferred embodiments when read with reference to the accompanying drawing.

BRIEF DESCRIPTION OF THE DRAWINGS

FIG. 6 shows a side view of a modified embodiment of annular disk halves;

FIG. 7 shows a top view of a second embodiment of a plate spring;

FIG. 8 shows a cross-sectional view of the plate spring shown in FIG. 7; and

FIG. 9 shows a cross-sectional view of a pressure sensor which is mounted at a rim by the spring shown in FIGS. 7 and 8 and by the annular disk halves shown in FIG. 6.

DETAILED DESCRIPTION OF THE PREFERRED EMBODIMENTS

Figure 1:
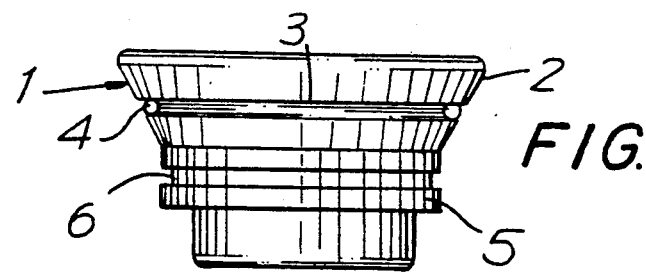
FIG. 1 shows a side view of the housing of a pressure sensor or switch, according to the invention.
Figure 2:
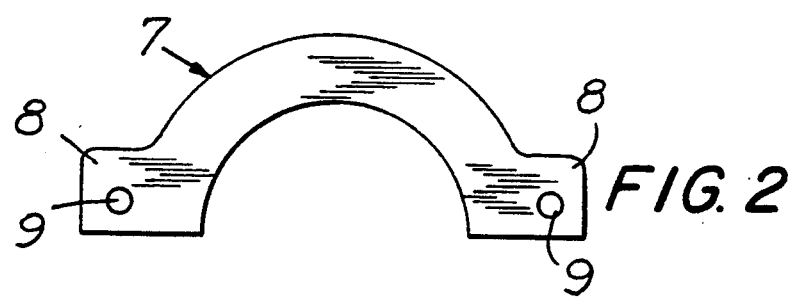
FIG. 2 shows a side view of one of the two annular disk halves forming an annular flange.

FIG. 1 shows a pressure sensor housing 1 for a pressure sensor as is shown and described in particular, e.g., in FIG. 2 of DE-OS 35 23 774. The housing 1 comprises a conically tapering flange portion 2 which is provided with an annular groove 3 for receiving a sealing O-ring 4. An annular groove 6 is formed on a cylindrical housing portion 5 at a distance from the conical flange portion 2.

FIG. 2 shows one of two annular disk halves 7 which complement one another in a pair to form a closed ring. The annular disk halves 7 comprise outwardly projecting portions 8 with recesses 9. The latter are constructed as circular holes in the described embodiment.

Figure 3:
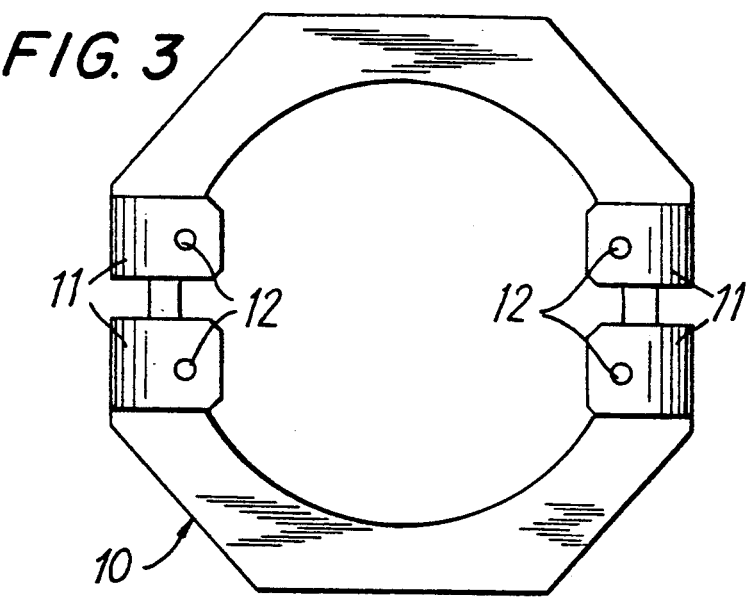
FIG. 3 shows a front view of a plate spring.
Figure 4:
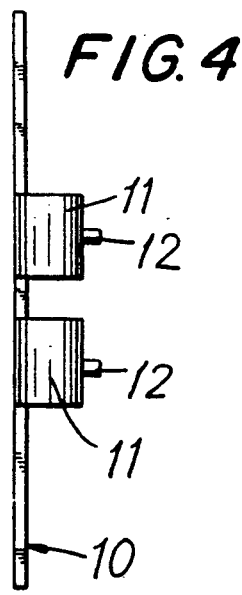
FIG. 4 shows a side view of the spring according to FIG. 3.

FIG. 3 shows a spring 10 which is constructed as a plate spring. The spring 10 comprises portions 11 which are bent inward and form ends having a U-shape in cross section; projections 12 project outward from the latter as pins. Four such portions 11 are provided with four projections 12 in the described embodiment. The relative distance between the projections 12 and recesses 9 are selected in such a way that they can engage into the recesses 9 of two annular disk halves 7 which are placed together.

Figure 5:
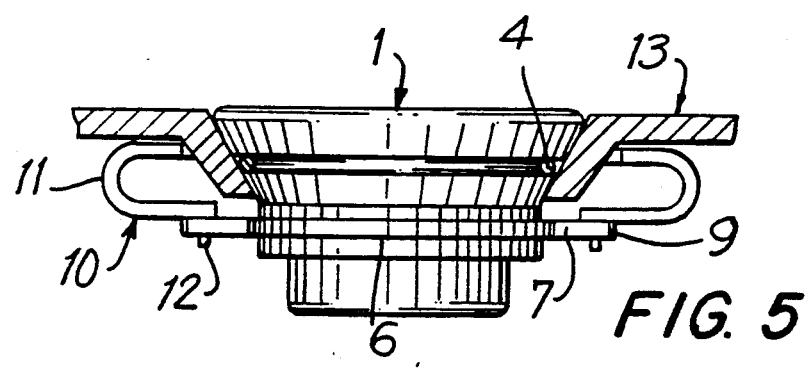
FIG. 5 shows a cross-sectional view of a pressure sensor mounted at a rim by the spring, according to FIGS. 3 and 4, and the annular disk halves, according to FIG. 2.

FIG. 5 shows how a pressure sensor and its housing 1, shown in FIG. 1, can be mounted in a rim wall 13, shown in section, wherein the interior of the tire is located at the top in the view according to FIG. 5.

For the purpose of mounting, the housing 1 is slid (from the top with reference to FIG. 5) through a corresponding recess 14 with conically extending side walls of the rim wall 13 until the flange portion 2 of the housing 1 contacts the conical inner wall 15 of the recess 14, wherein an airtight contact is ensured by the inserted sealing O-ring 4.

The spring 10 is now attached, so that the shoulders 11 contact the rim wall 13 in a springing manner and the pin projections 12 face downward in FIG. 5. The two annular disk halves 7 are then inserted into the annular groove 6 from two directions, which are opposite one another by 180°, until the pin-shaped projections 12 catch in the recesses 9. In this way, the annular disk halves 7 are secured radially by means of the projections 12 and axially by means of the groove 6. However, the housing 1 is also accordingly clamped and secured against the rim wall 13 due to the spring action of the shoulders 11.

In the embodiment shown in FIGS. 6 to 9, the annular disk halves 7' are constructed as simple ring halves (compare FIG. 6).

A spring 10', shown in FIG. 7, comprises a circumferentially extending annular bead 16. Four recesses 17 provide for the adjustment of a desired spring characteristic.

As shown in FIG. 9, the housing 1 is first inserted into a recess 14 of the rim wall 13 in this embodiment, as was described in connection with FIG. 5.

The spring 10' in the form of a plate spring is then placed on the cylindrical housing portion 5 in such a way that the outer rim 18 of the spring 10' contacts the rim wall 13 and the annular bead 16 faces in the opposite direction, i.e. downward with reference to FIG. 9. If the annular disk halves 7' are now locked into the annular groove 6 accompanied by elastic deformation of the spring 10', the annular bead 16 engages over the outer rim 19 of the annular disk halves 7' and secures the latter radially. The housing 1 is simultaneously clamped in the recess 14 of the rim wall 13 in this way.

While the invention has been illustrated and described as embodied in a pressure sensor for determining tire pressure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pressure sensor for determining air pressure in an interior of a motor vehicle tubeless tire having a rim wall and a recess forming an opening in the rim wall, said pressure sensor comprising a housing for extending into the rim wall recess, and having an outer flange portion for engaging a first side of the rim wall; annular flange means located on said housing in a spaced relationship relative to said rim wall and spring means supportable by said annular flange means against a second side of the rim wall for clamping said outer flange portion against the first side of the rim wall.

2. A pressure sensor as set for in claim 1, further comprising a sealing O-ring, said outer flange portion having a circumferentially extending annular groove for receiving said sealing O-ring.

3. A pressure sensor as set forth in claim 1, wherein the first side of the rim wall has a conical surface and said outer flange portion has a corresponding conical shape for engaging the conical surface of the first side of the rim wall.

4. A pressure sensor as set forth in claim 1, said annular flange means comprises two corresponding annular disc halves, said housing having an annular groove for receiving said two annular disc halves.

5. A pressure sensor as set forth in claim 1, wherein said spring means comprises a plate spring.

6. A pressure sensor as set forth in claim 5, wherein said annular disc halves have one of projections and recesses, and said plate spring has another of projections and recesses engageable with said one of projections and recesses.

7. A pressure sensor as set forth in claim 5, wherein said plate spring has circumferentially extending bead engageable with said annular flange means.

* * * * *